(12) United States Patent
Li

(10) Patent No.: US 10,904,598 B2
(45) Date of Patent: Jan. 26, 2021

(54) APPARATUSES, SYSTEMS AND METHODS FOR SHARING CONTENT

(71) Applicant: Lisa Li, Beijing (CN)

(72) Inventor: Lisa Li, Beijing (CN)

(\*) Notice: Subject to any disclaimer, the term of this patent is extended or adjusted under 35 U.S.C. 154(b) by 73 days.

(21) Appl. No.: 16/263,522

(22) Filed: Jan. 31, 2019

(65) Prior Publication Data

US 2020/0252667 A1  Aug. 6, 2020

(51) Int. Cl.
| | |
|---|---|
| *H04N 21/24* | (2011.01) |
| *H04N 21/258* | (2011.01) |
| *H04N 21/4363* | (2011.01) |
| *G06K 9/34* | (2006.01) |
| *H04N 21/442* | (2011.01) |
| *G06K 9/46* | (2006.01) |

(52) U.S. Cl.
CPC ......... *H04N 21/2407* (2013.01); *G06K 9/344* (2013.01); *G06K 9/4609* (2013.01); *H04N 21/25891* (2013.01); *H04N 21/43637* (2013.01); *H04N 21/44222* (2013.01)

(58) Field of Classification Search
CPC ......... H04N 21/2407; H04N 21/25891; H04N 21/43637; H04N 21/44222
See application file for complete search history.

(56) References Cited

U.S. PATENT DOCUMENTS 10,491,940 B1 \* 11/2019 Sinnott .............. H04N 21/4532
2017/0245128 A1 \* 8/2017 Cronholm ........... G06F 3/04883

\* cited by examiner

*Primary Examiner* — Yassin Alata
(74) *Attorney, Agent, or Firm* — Kinney & Lange, P.A.

(57) ABSTRACT

The present disclosure provides apparatuses, systems and methods for sharing content. The apparatus for sharing content comprises: a sensor configured to sense an action of at least one of a plurality of first terminal devices to generate sensor data; a processor; and a first storage configured to store processor-executable instructions, wherein when the processor-executable instructions stored in the first storage are executed by the processor, the processor is configured to perform steps of: determining whether a sharing event occurs based on the sensor data from the sensor; acquiring data related to content to be shared from at least one of the plurality of first terminal devices in response to the occurrence of the sharing event; analyzing the date related to content to be shared to obtain an indication of the content to be shared; and transmitting the indication of the content to be shared to at least one of a plurality of second terminal devices.

16 Claims, 10 Drawing Sheets

APPARATUSES, SYSTEMS AND METHODS FOR SHARING CONTENT

TECHNICAL FIELD

The present disclosure relates to the field of data transmission, and more particularly, to apparatuses, systems and methods for sharing content.

BACKGROUND

With the development of technologies, sharing content such as document, music, movie between different terminal devices is widely desired in various scenes. Conventionally, content is shared between terminal devices through converting the format of the content by a terminal device and transmitting the converted content from the terminal device to another terminal device. This requires a specific protocol and a large amount of data transmission between the terminal devices.

SUMMARY

The present disclosure provides apparatuses, systems and methods for sharing content.

According to an aspect of the present disclosure, there is provided an apparatus for sharing content comprising: a sensor configured to sense an action of at least one of a plurality of first terminal devices to generate sensor data; a processor; and a first storage configured to store processor-executable instructions, wherein when the processor-executable instructions stored in the first storage are executed by the processor, the processor is configured to perform steps of: determining whether a sharing event occurs based on the sensor data from the sensor; acquiring data related to content to be shared from at least one of the plurality of first terminal devices in response to the occurrence of the sharing event; analyzing the date related to content to be shared to obtain an indication of the content to be shared; and transmitting the indication of the content to be shared to at least one of a plurality of second terminal devices.

In an example, the apparatus further comprises a wireless local area network interface configured to establishing connections to the plurality of first terminal devices and the plurality of second terminal devices, wherein the processor is further configured to determine at least one of the plurality of second terminal devices as a sharing object according to the sensor data, and transmit the indication of the content to be shared to the sharing object via the wireless local area network interface.

In an example, the processor is further configured to: after the indication of the content to be shared is transmitted to the sharing object, receive from the sharing object, feedback data related to the checking of the content to be shared via the wireless local area network interface, determine a level of being interest to the content to be shared according to the feedback data, and determine the priority of the content to be shared for the sharing object based on the level of being interest; and after the indication of the content to be shared is obtained and the sharing object is determined, transmit the indication of the content to be shared to the sharing object by priority.

In an example, the feedback data related to the checking of the content to be shared comprises at least one of: number of checking(s) of the content to be shared, duration of checking(s) of the content to be shared, and purchase of the content to be shared.

In an example, the sensor comprises an image sensor, and the sensor data from the image sensor comprises an image displayed by the at least one of the plurality of first terminal devices; the content sharing device further comprises a second storage configured to store a reference image; and the processor is configured to determine whether the image from the image sensor matches with the reference image stored in the second storage, and if yes, determine the sharing event occurs, determine the second terminal device matching with the sharing event as the sharing object, capture, by using the image sensor, an image of a searching interface displayed by the first terminal device where the sharing event occurs, analyze the image of the searching interface to identify a name of the searched content, and transmit, as the indication of the content to be shared, the name of the searched content to the sharing object via the wireless local area network interface.

In an example, the reference image comprises an image of a starting interface of an application which is one of an e-book application, an audio player application, and a video player application, and the second terminal device is one of an e-book reader, a stereo equipment and a set top box.

In an example, the processor is configured to determine the e-book reader as the sharing object when the image from the image sensor matches with the image of the starting interface of the e-book application, determine the stereo equipment as the sharing object when the image from the image sensor matches with the image of the starting interface of the audio player application, and determine the set top box as the sharing object when the image from the image sensor matches with the image of the starting interface of the video player application.

In an example, the processor is further configured to before determining whether the image from the image sensor matches with the reference image stored in the second storage, determine whether the image from the image sensor does not change for predetermined period of time, and if yes, perform the step of determining whether the image from the image sensor matches with the reference image stored in the second storage.

In an example, the sensor further comprises an audio sensor, and the sensor data from the audio sensor comprises a voice command for using the application on the first terminal device; the second storage is further configured to store a list of applications; and the processor is further configured to identify the application being used on the first terminal device according to the voice command, determine whether the application being used falls with the list of applications, and if yes, determine the sharing event occurs and determine the sharing object according to the application being used.

In an example, the apparatus further comprises a wide area network interface configured to connect to a content provider via internet, wherein the processor is configured to after the name of the searched content is identified, acquire an address of the searched content from the content provider via the wide area network according to the name of the searched content, and transmit, as the indication of the content to be shared, the address of the searched content to the sharing object via the wireless local area network interface.

According to another aspect of the present disclosure, there is provided a system for sharing content comprising an apparatus for sharing content comprising: a sensor configured to sense an action of at least one of a plurality of first terminal devices to generate sensor data; a processor; and a first storage configured to store processor-executable instructions, wherein when the processor-executable instructions stored in the first storage are executed by the processor, the processor is configured to perform steps of: determining whether a sharing event occurs based on the sensor data from the sensor; acquiring data related to content to be shared from at least one of the plurality of first terminal devices in response to the occurrence of the sharing event; analyzing the date related to content to be shared to obtain an indication of the content to be shared; and transmitting the indication of the content to be shared to at least one of a plurality of second terminal devices.

According to an aspect of the present disclosure, there is provided a method for sharing content, the method comprising: sensing, by a sensor, an action of at least one of a plurality of first terminal devices to generate sensor data; determining whether a sharing event occurs based on the sensor data from the sensor; acquiring data related to content to be shared from at least one of the plurality of first terminal devices in response to the occurrence of the sharing event; analyzing the date related to content to be shared to obtain an indication of the content to be shared; and transmitting the indication of the content to be shared to at least one of a plurality of second terminal devices.

In an example, the apparatus further comprises a wireless local area network interface configured to establishing connections to the plurality of first terminal devices and the plurality of second terminal devices; and the method further comprises determining at least one of the plurality of second terminal devices as a sharing object according to the sensor data, and transmitting the indication of the content to be shared to the sharing object via the wireless local area network interface.

In an example, the method further comprises: after the indication of the content to be shared is transmitted to the sharing object, receiving, from the sharing object, feedback data related to the checking of the content to be shared via the wireless local area network interface, determining a level of being interest to the content to be shared according to the feedback data, and determining the priority of the content to be shared for the sharing object based on the level of being interest; and after the indication of the content to be shared is obtained and the sharing object is determined, transmitting the indication of the content to be shared to the sharing object by priority.

In an example, the sensor comprises an image sensor, the sensor data from the image sensor comprises an image displayed by the at least one of the plurality of first terminal devices, and the method further comprises: determining whether the image from the image sensor matches with a reference image, and if yes, determining the sharing event occurs; determining the second terminal device matching with the sharing event as the sharing object; capturing, by using the image sensor, an image of a searching interface displayed by the first terminal device where the sharing event occurs; analyzing the image of the searching interface to identify a name of the searched content; and transmitting, as the indication of the content to be shared, the name of the searched content to the sharing object via the wireless local area network interface.

In an example, the reference image comprises an image of a starting interface of an application which is one of an e-book application, an audio player application, and a video player application, and the second terminal device is one of an e-book reader, a stereo equipment and a set top box.

In an example, determining the second terminal device matching with the sharing event as the sharing object comprises: determining the e-book reader as the sharing object when the image from the image sensor matches with the image of the starting interface of the e-book application; determining the stereo equipment as the sharing object when the image from the image sensor matches with the image of the starting interface of the audio player application; and determining the set top box as the sharing object when the image from the image sensor matches with the image of the starting interface of the video player application.

In an example, the method further comprises: before determining whether the image from the image sensor matches with the reference image stored in the second storage, determining whether the image from the image sensor does not change for predetermined period of time, and if yes, performing the step of determining whether the image from the image sensor matches with the reference image stored in the second storage.

In an example, the sensor further comprises an audio sensor, the sensor data from the audio sensor comprises a voice command for using the application on the first terminal device, and the method further comprises: identifying the application being used on the first terminal device according to the voice command; determining whether the application being used falls with the list of applications, and if yes, determining the sharing event occurs and determining the sharing object according to the application being used.

In an example, the apparatus further comprises a wide area network interface configured to connect to a content provider via internet, and the method further comprises: after the name of the searched content is identified, acquiring an address of the searched content from the content provider via the wide area network according to the name of the searched content; and transmitting, as the indication of the content to be shared, the address of the searched content to the sharing object via the wireless local area network interface.

DETAILED DESCRIPTION

Specific embodiments of the present disclosure will be described in detail below. It should be illustrated that the embodiments described here are for illustrative purposes only and are not intended to limit the present disclosure. In the following description, numerous specific details are set forth in order to provide a thorough understanding of the present disclosure. However, it will be apparent to those of ordinary skill in the art that the present disclosure may be practiced without these specific details. In other instances, well-known circuits, materials, or methods have not been described in detail in order to avoid obscuring the present disclosure.

Throughout the specification, references to "one embodiment", "an embodiment", "one example" or "an example" are intended to mean that particular features, structures, or characteristics described in connection with the embodiment or example are included in at least one embodiment of the present disclosure. Therefore, phrases "in one embodiment", "in an embodiment", "one example" or "an example" appearing throughout the specification do not necessarily refer to the same embodiment or example. Furthermore, the particular features, structures, or characteristics may be combined in one or more embodiments or examples in any suitable combination and/or sub-combination. In addition, it should be understood by those of ordinary skill in the art that the accompanying drawings are provided here for the purpose of illustration, and the accompanying drawings are not necessarily drawn to scale. The term "and/or" used here comprises any and all combinations of one or more of associated listed items.

Embodiments of the present disclosure will be described below with reference to the accompanying drawings.

The embodiments of the present disclosure provide apparatuses, systems, and method for sharing content. According to the embodiments of the present disclosure, content could be shared between a first terminal device and a second terminal device, eliminating the need of a specific protocol and reducing the amount of data transmitted between the terminal devices.

Figure 1:
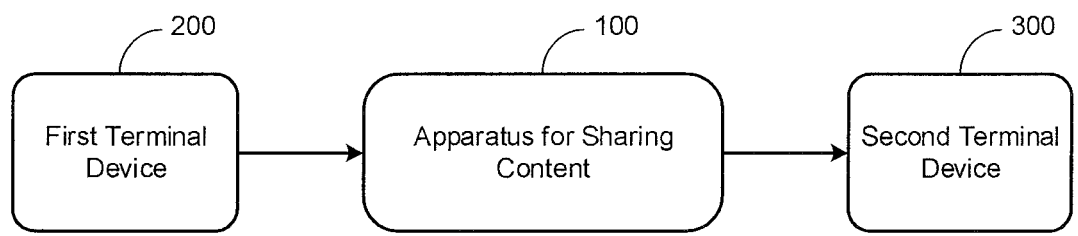
FIG. 1 illustrates a schematic diagram of a system for sharing content according to an embodiment of the present disclosure.

FIG. 1 illustrates a schematic diagram of a system for sharing content according to an embodiment of the present disclosure.

As shown in FIG. 1, the system for sharing content according to an embodiment of the present disclosure includes an apparatus for sharing content 100, a first terminal device 200 and a second terminal device 300. The apparatus 100 is connected to the second terminal device 300 through a wired connection such as USB (Universal Serial Bus), or a wireless connection such as Wi-Fi (Wireless Fidelity), NFC (Near Field Communication), Bluetooth and the like. The first terminal device 200 may be one of mobile phone, tablet, PC (Personal Computer), intelligent wearing device and the like. The second terminal device 300 may be one of e-book reader, audio equipment such as stereo system, STB (Set Top Box), television, projector and the like. When a sharing event, such as sharing of book, music, or movie, occurs on the first terminal device 200, an action of sharing such as starting of a respective application is performed on the first terminal device 200. The apparatus 100 senses such action by a sensor to determine whether the sharing event occurs, generates an indication of content to be shared in response to the occurrence of the sharing event, and transmits the indication to the second terminal device 300. The second terminal device 300 uses the indication to obtain the content to be shared and renders the content to be shared. In this manner, content is shared between the first terminal device 200 and the second terminal device 300.

Figure 2:
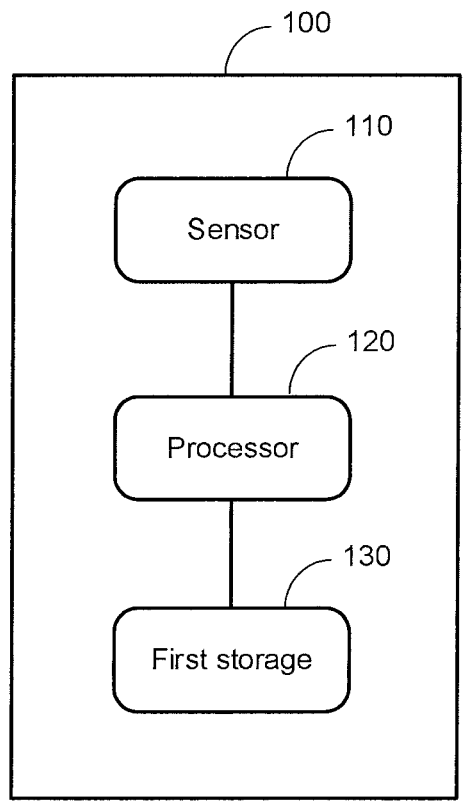
FIG. 2 illustrates a block diagram of an apparatus for sharing content in the system of FIG. 1.

FIG. 2 illustrates a block diagram of an apparatus for sharing content in the system of FIG. 1.

As shown in FIG. 2, the apparatus 100 includes a sensor 110, a processor 120 and a first storage 130. The sensor 110 may sense the action of the first terminal device 100 to generate sensor data. The sensor 110 may be at least one of an image sensor such as a camera and an audio sensor such as a microphone. Processor-executable instructions are stored in the first storage 130. The first storage 130 includes, but not limited to, ROM (Read-Only Memory), RAM (Random Access Memory), EPROM (Erasable Programmable Read-Only Memory), EEPROM (Electrically Erasable Programmable Read-Only Memory), Flash and the like. The processor 120 executes the processor-executable instructions stored in the first storage 130 to perform steps of: determining whether a sharing event occurs based on the sensor data from the sensor 110, acquiring data related to content to be shared from the first terminal device 200 in response to the occurrence of the sharing event, analyzing the date related to content to be shared to obtain an indication of the content to be shared; and transmitting the indication of the content to be shared to the second terminal device 300. The processor 120 includes, but not limited to, CPU (Central Processing Unit), GPU (Graphics Processing Unit), ASIC (Application Specific Integrated Circuit), FPGA (Field Programmable Gate Array), DSP (Digital Signal Processor) and the like.

In an example, the first terminal device 200 is a mobile phone and the second terminal device 300 is an e-book reader. When a user would like to share a book with the second terminal device 300, he/she could startup an e-book application on the mobile phone and then turn on the apparatus 100 to detect the action of the startup by using the sensor data from the sensor 110, for example by using the image of the screen of the mobile phone, which is captured by the camera. In some example, it is also possible for the apparatus 100 to sense periodically during the operation of the first terminal device 200 in order to detect the action of startup the e-book application on the first terminal device 200. In response of the startup of the e-book application is detected, the apparatus 100 acquires data related to book from the mobile phone, for example the apparatus 200 may capture an image of the searching interface displayed by the mobile phone by using the camera. The apparatus 100 identifies the name of the book from the image of the searching interface, and transmit the name of the book to the e-book reader in a format which is recognizable by the e-book reader. The e-book reader may search for the book locally or from the internet by using the name of the book, obtain the content of the book from a content provider and render the content of the book. The e-book reader has an electronic paper screen which is based on an electronic ink technology, and thus is capable of provide a better experience in reading as compared to the mobile phone which renders the book by using an LED or LCD screen. With the apparatus 100 of the present disclosure, it is possible to render the book on an e-book reader without transmitting the full text of the book to the e-book reader. Furthermore, the human-machine interactions are performed between the user and the mobile phone which is capable of provide the user a faster and smoother experience in searching as compared to the e-book reader. Therefore, with the apparatus 100 according to the embodiments of the present disclosure, it is possible to provide a faster interaction and a better experience in reading e-books.

In another example, the first terminal device 200 is a tablet and the second terminal device 300 is audio equipment. Similarly, the apparatus 100 detects the action of using an audio player application on the tablet based on the image of the screen of the tablet, which is captured by the camera. In response of the usage of the audio player application is detected, the apparatus 100 captures an image of the searching interface displayed by the tablet, identifies the name of the music from the image of the searching interface, and transmit the name of the music to the audio equipment in a format which is recognizable by the audio equipment. The audio equipment may search for the music, locally or from the internet, by using the name of the music, obtain the content of the music from a content provider and playing the music. The audio equipment may provide a better experience in playing music as compared to the tablet, while the tablet may provide a faster interaction as compared to the audio equipment. With the apparatus 100 of the present disclosure, it is possible to sharing the music without transmitting the entire music from the tablet to the audio equipment, while providing a faster interaction and a better experience of music playing.

In yet another example, the first terminal device 200 is a PC and the second terminal device 300 is STB which may be connected to a TV. Similarly, the apparatus 100 detects the action of using a video player application to play a video such as a movie on the PC based on the image of the screen of the tablet, which is captured by the camera. In response of the usage of the video player application is detected, the apparatus 100 captures an image of the searching interface displayed by the tablet, identifies the name of the video from the image of the searching interface, and transmit the name of the video to the STB in a format which is recognizable by the STB. The STB may search for the music locally or from the internet by using the name of the video, obtain the content of the video from a content provider and playing the video by the TV which is connected to the STB. The STB in combination with the TV may provide a better experience in playing video as compared to the PC, while the PC may provide a faster interaction as compared to the STB. With the apparatus 100 of the present disclosure, it is possible to sharing the video without transmitting the entire video from the PC to the STB, while providing a faster interaction and a better experience of video playing.

Figure 3:
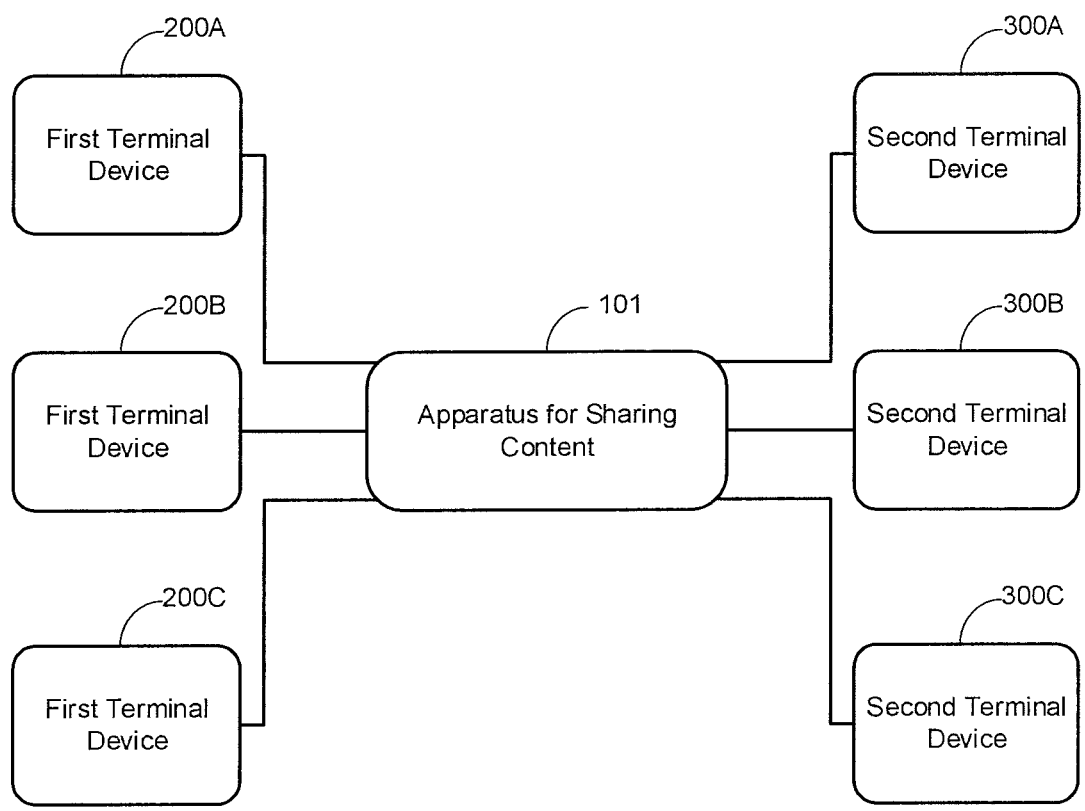
FIG. 3 illustrates a schematic diagram of a system for sharing content according to another embodiment of the present disclosure.
Figure 4:
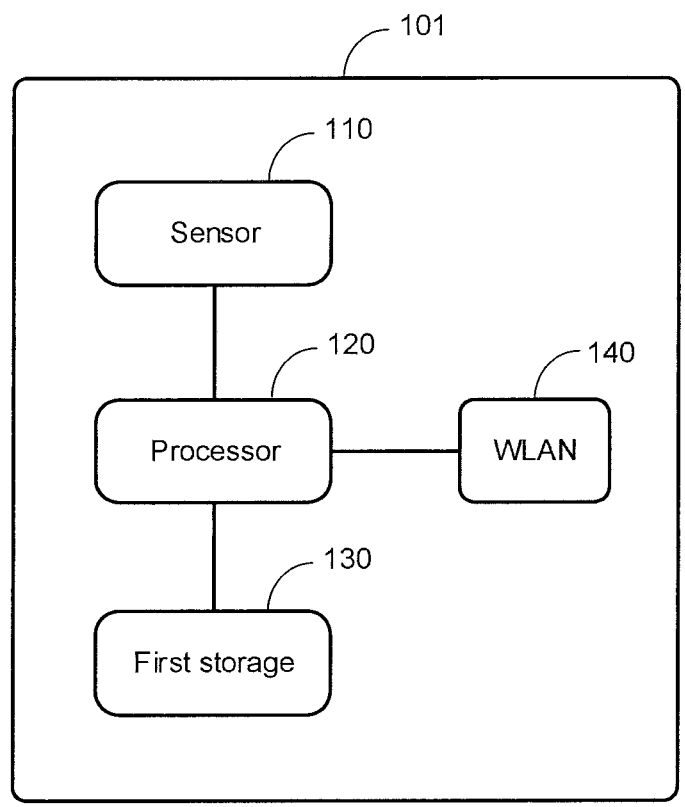
FIG. 4 illustrates a block diagram of an apparatus for sharing content in the system of FIG. 3.

FIG. 3 illustrates a schematic diagram of a system for sharing content according to another embodiment of the present disclosure. FIG. 4 illustrates a block diagram of an apparatus for sharing content in the system of FIG. 3. The system for sharing content of FIG. 3 is similar to the system of FIG. 1, except that the apparatus 101 for sharing content is connected to a plurality of first terminals 200A, 200B and 200C and a plurality of second terminal devices 300A, 300B, and 300C. The apparatus 101 of FIG. 4 is similar to the apparatus 100 of FIG. 2, except that the apparatus 101 further comprise at least one WLAN (Wireless Local Area Network) interface 140. Hereinafter, for the sake of clarity, only the different parts will be described in detail.

As shown in FIG. 3 and FIG. 4, the first terminal devices 200A, 200B and 200C and the second terminal devices 300A, 300B, and 300C may be connected to the apparatus 101 via the WLAN interface 140, such that a local area network is established. When a sharing event, such as sharing of book, music, or movie, occurs on one or more of the first terminal device 200A, 200B and 200C, e.g. on the first terminal device 200A, an action of sharing such as starting of an respective application is performed on the first terminal device 200A. The apparatus 100 senses such action by the sensor 110 to determine whether the sharing event occurs, generates an indication of content to be shared in response to the occurrence of the sharing event. The processor 120 may determine at least one of the second terminal devices 300A, 300B, and 300C as a sharing object according to the sensor data.

As an example, the processor 120 determines whether the image from the image sensor matches with a reference image, and if yes, determines that the sharing event occurs. As another example, before determining whether the image from the image sensor matches with the reference image stored in the second storage, the processor 120 may determine whether the image from the image sensor does not change for predetermined period of time, and if yes, perform the step of determining whether the image from the image sensor matches with the reference image stored in the second storage.

If the sharing event occurs, the processor 120 determines the second terminal device (e.g. 300A) matching with the sharing event as the sharing object, captures, by using the image sensor, an image of a searching interface displayed by the first terminal device 200A where the sharing event occurs, analyzes the image of the searching interface to identify a name of the searched content, and transmits, as the indication of the content to be shared, the name of the searched content to the second terminal 300A via the WLAN interface 140.

The second terminal device 300A uses the indication to obtain the content to be shared and renders the content to be shared. In this manner, content is shared between the first terminal device 200A and the second terminal device 300A.

In some embodiments, if multiple slices of content are shared, indications of the slices of content may be transmitted to the sharing object by priorities of the slices of content. There are various ways to determine and update the priority of the slices of content.

As an example, after the indication of the content to be shared is transmitted to the sharing object, the processor 120 may receive from the sharing object 300A, feedback data related to the checking of the content to be shared via the WLAN interface 140. The feedback data related to the checking of the content to be shared comprises at least one of: number of checking(s) of the content to be shared, duration of checking(s) of the content to be shared, and purchase of the content to be shared. The processor 120 may determine a level of being interest to the content to be shared according to the feedback data, and determine the priority of the content to be shared for the sharing object based on the level of being interest. The priority of the content to be shared may be updated after the content sharing is finished or updated periodically.

As another example, the content to be shared may carry priority information, such content includes, but not limited to, graded movies, grouped documents, music belonging to different playing lists. The processor 120 may communicate with the first terminal device(s) where the sharing event occurs, e.g. the first terminal 200A, through the WLAN interface 140 or a USB interface, to obtain the priority information of the content to be shared. The processor 120 may analyze the priority information of the content to be shared to determine the priority of the content to be shared. For example, the processor 120 may assign high priority to the movie graded to be suitable for people of different ages, and assign low priority to the movie graded to adults only. The movie of high priority may be transmitted directly to the sharing object, while the transmission of the movie of low priority may requires a confirmation from the user of the first terminal device. In some embodiments, the priority information may also include the number of checking(s) of the content, the duration of checking the content, and the purchase of the content. The processor 120 may determine the priority based on the number of checking(s) of the content, the duration of checking the content, the purchase of the content, or any combination thereof. For example, the processor 120 may calculate a weighed sum of the number of checking(s) of the content and the duration of checking the content. The weighted sum may be adjusted as following: increase the weighed sum by a factor if the content has been purchased, and decrease the weighted sum by a factor if the content has not been purchased. The adjusted weighted sum may be used as the priority of the content.

In some embodiments, if there are multiple sharing objects such as second terminal devices 300A and 300B, indication of the content may be transmitted to the sharing objects by priorities of the sharing objects. There are various ways to determine and update the priority of the sharing objects.

As an example, the processor 120 may establish a table which records e.g. identities such as types, brands, and model numbers of the second terminal devices as well as the number of usages of each second terminal device. The processor 120 determines the priority of each of the second terminal devices based on the table. For example, if there are two e-book readers with different model numbers, the processor 120 may assign a higher priority to the e-book reader which is used more frequently by the user, vice versa. When transmitting the content, the processor 120 may transmit the content to the e-book reader having a higher priority if the two e-book readers are both determined as the sharing objects. It is also possible for the user to preset the priories of the second terminal devices and the processor 120 may transmit content to the second terminal devices according to the preset priorities.

As another example, the priority of the sharing object may be determined according to the priority information of the content to be shared. For example, the processor 120 may group the second terminal devices into adults group and children group. If the second terminal device in the adults group and the second terminal device in the children group are both determined as sharing objects and the priority information of the content indicates that the content is not suitable to children, the processor 120 may transmit the content to the second terminal device of the adults group or inquires the adult user. In some embodiments, it is also possible for the processor to group the first terminal devices, such as into adults group and children group. If the processor 120 detects that the first or second terminal device of the children group attempts to share content not suitable for children, the processor 120 may inform this to the first or second terminal device of the adults group.

Figure 5:
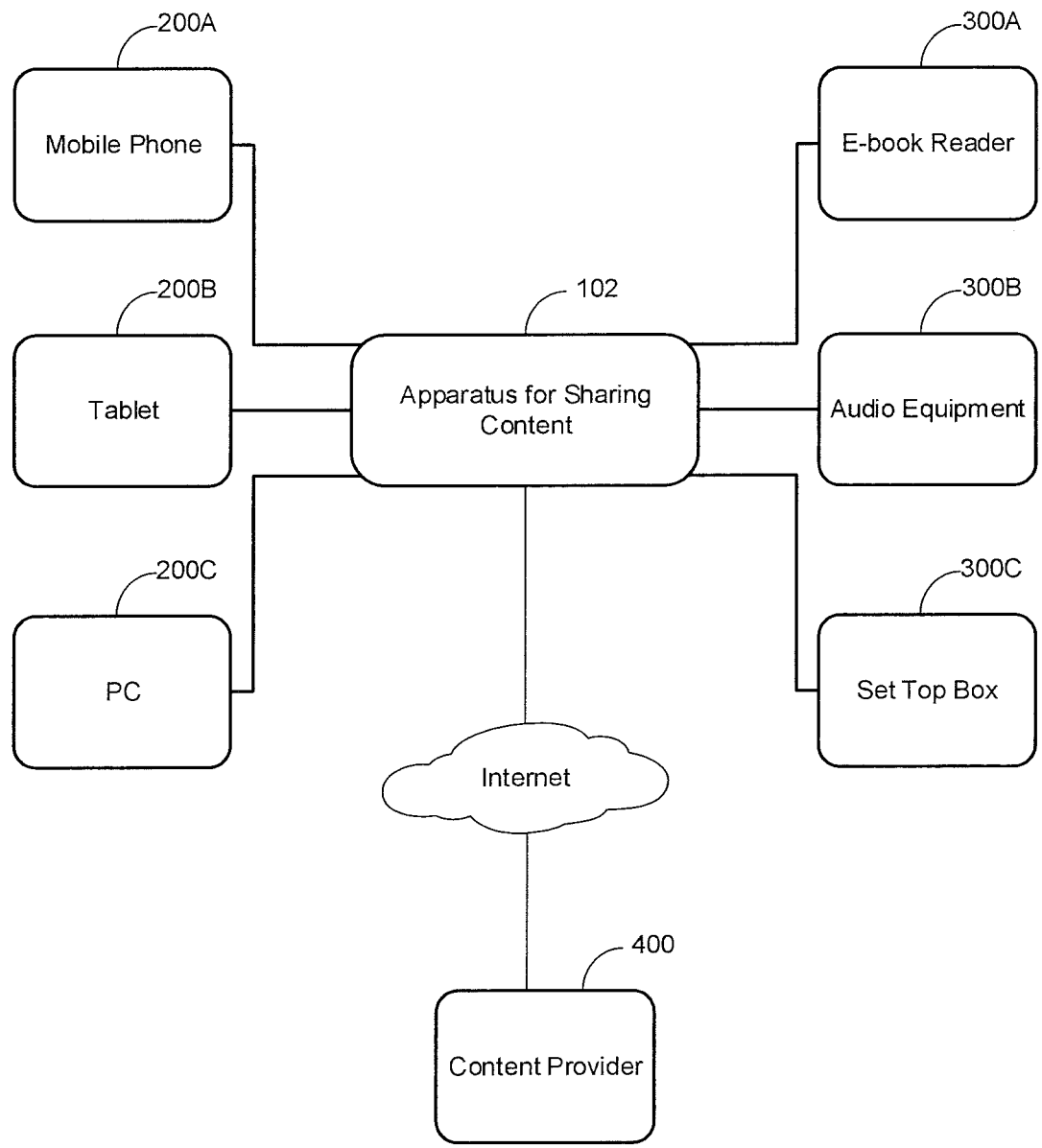
FIG. 5 illustrates a schematic diagram of a system for sharing content according to yet another embodiment of the present disclosure.

FIG. 5 illustrates a schematic diagram of a system for sharing content according to yet another embodiment of the present disclosure. The system for sharing content of FIG. 5 is similar to the system of FIG. 3, except that the apparatus 102 for sharing content is connected to different kinds of first terminal devices, i.e. a mobile phone 200A, a tablet 200B and a PC 200C, and different kinds of second terminal devices, i.e. an e-book reader 300A, audio equipment 300B, and a STB 300C. Furthermore, the apparatus 102 of FIG. 6 is connected to the internet to access one or more content provider 400.

In FIG. 5, processor 120 of the apparatus 102 may compare the image from the image sensor matches with a reference image, and if the image from the image sensor matches with the reference image determines that the sharing event occurs. For example, the reference image may include an image of a starting interface of an application which is one of an e-book application, an audio player application, and a video player application. The processor 120 of the apparatus 102 may determine one or more of the terminal devices 300A, 300B, and 300C as the object. For example, if the image from the image sensor matches with the image of the starting interface of the e-book application, the e-book reader 300A is determined as the sharing object; if the image from the image sensor matches with the image of the starting interface of the audio player application, the stereo equipment 300B is determined as the sharing object; and if the image from the image sensor matches with the image of the starting interface of the video player application, the set top box is determined as the sharing object.

Figure 6:
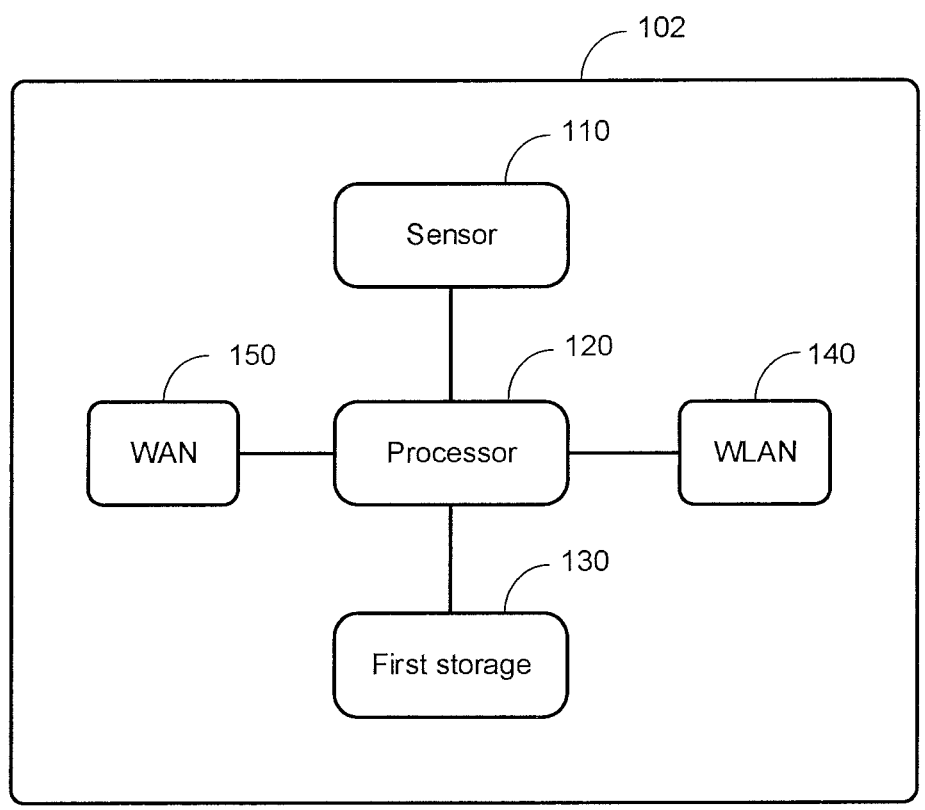
FIG. 6 illustrates a block diagram of an example of an apparatus for sharing content in the system of FIG. 5.

FIG. 6 illustrates a block diagram of an example of an apparatus for sharing content in the system of FIG. 5. The apparatus 102 of FIG. 6 is similar to the apparatus 101 of FIG. 4, except that the apparatus 102 may further include at least one WAN (Wide Area Network) interface 150, so that the apparatus 102 may be implemented as a router which is capable of establishing a local area network and accessing the internet. Hereinafter, for the sake of clarity, only the different parts will be described in detail.

As shown in FIGS. 5 and 6, the apparatus 102 is capable of connecting to the content provider 400 through the internet by using the WAN interface 150. After the name of the searched content is identified, the processor 120 may acquire an address of the searched content from the content provider 400 via the WAN interface according to the name of the searched content, and transmit, as indication of the content to be shared, the address of the searched content to the sharing object via the WLAN interface 140. Taking e-book reading as an example, after the e-book reader 300A is determined as the sharing object and the name of the e-book is identified, the apparatus 102 may access the content provider 400 which is an e-book content server to obtain the link address of the e-book, convert the link address into a format which may be recognized by the e-book reader 300A, and transmit the converted link address to the e-book reader 300A. In this manner, the e-book reader 300 may access the link address to obtain the content of the e-book from the internet, so that the e-book reader 300A can render the content without searching.

Figure 7:
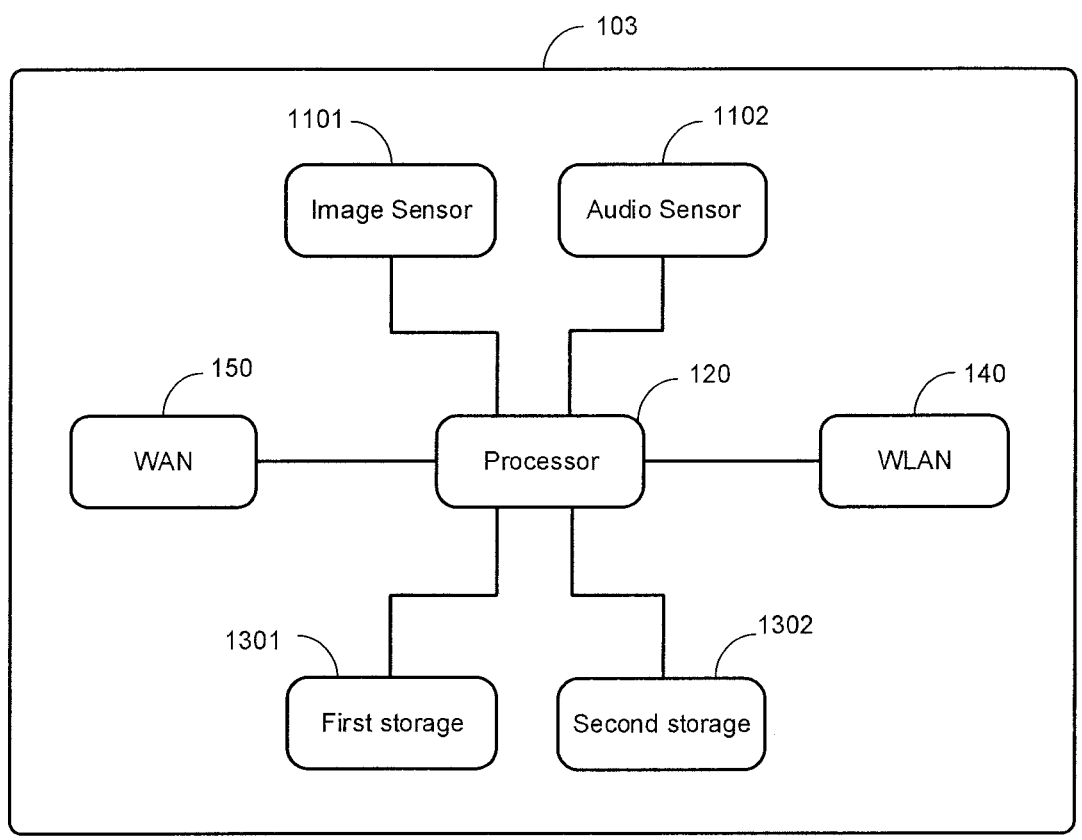
FIG. 7 illustrates a block diagram of another example of an apparatus for sharing content in the system of FIG. 5.

FIG. 7 illustrates a block diagram of another example of an apparatus for sharing content in the system of FIG. 5. The apparatus 103 of FIG. 7 is similar to the apparatus 102 of FIG. 6, except that the apparatus 103 includes two sensors, i.e. an image sensor 1101 and an audio sensor 1102, as well as two storages, i.e. a first storage 1301 and a second storage 1302. Hereinafter, for the sake of clarity, only the different parts will be described in detail.

The image sensor 1101 may provide image of the screen of the first terminal device while the audio sensor 1102 may sense the voice command for using the application on the first terminal device. The image sensor 1101 and the audio sensor 1102 may incorporate with each other in order to provide sensor data for detecting the action of the first terminal device and provide sensor data for identifying the indication of the content to be shared.

In an example, the audio sensor 1102 is used to provide sensor data for detecting the action of the first terminal device while the image sensor 1101 is used to provide sensor data for identifying the indication of the content to be shared. Particularly, the processor 120 may identify the application being used on the first terminal device according to the voice command from the audio sensor 1102, determine whether the application being used falls with a list of applications, and if yes, determine the sharing event occurs and determine the sharing object according to the application being used. For example, the list of applications may include e-book application, audio player application, and video player application. If it is identified that the application being used is an e-book application, the sharing event is detected and the e-book reader 300A is determined as the sharing object.

Each of the first storage 1301 and the second storage 1302 includes, but not limited to, ROM (Read-Only Memory), RAM (Random Access Memory), EPROM (Erasable Programmable Read-Only Memory), EEPROM (Electrically Erasable Programmable Read-Only Memory), Flash and the like. In an example, the first storage 1301 may be implemented with ROM and the second storage 1302 may be implemented with RAM. The processor-executable instructions as described above may be stored in the first storage 1301. The reference image and/or the list of applications as described above may be stored in the second storage 1302.

Figure 8:
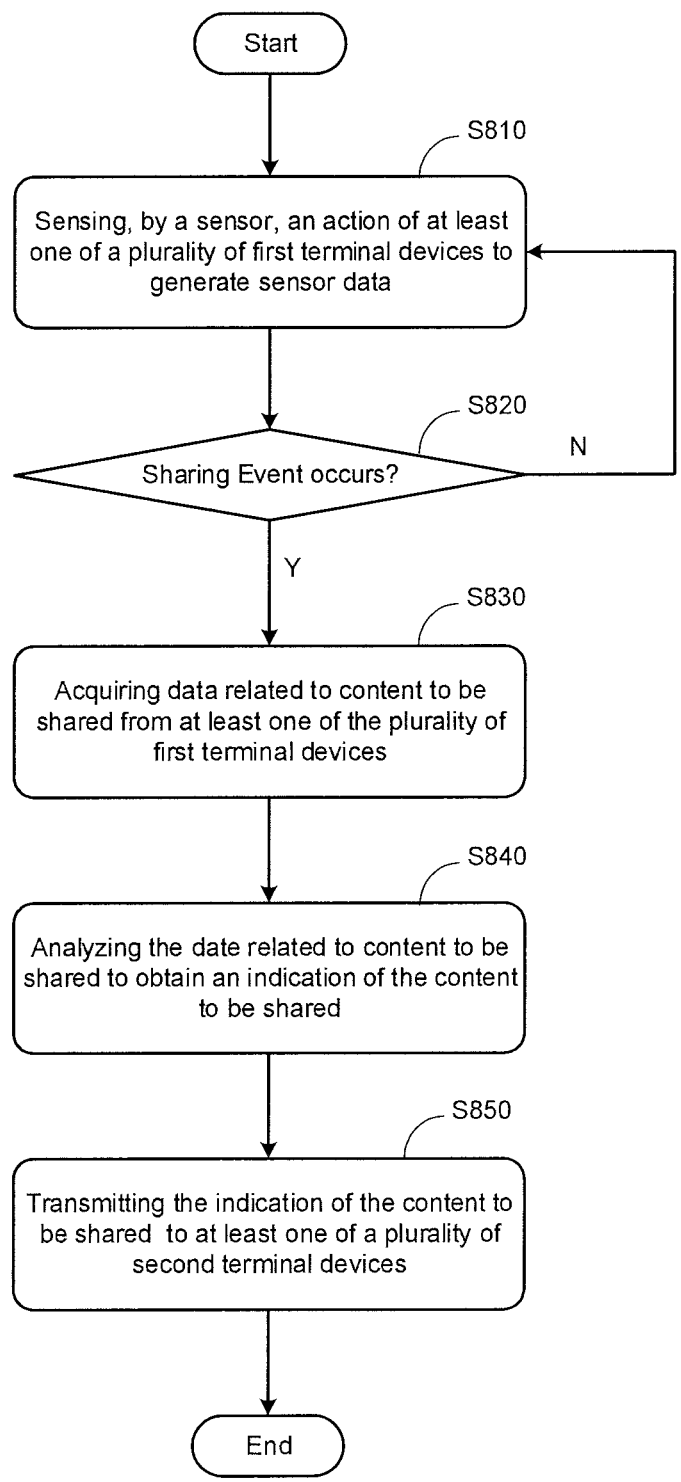
FIG. 8 illustrates a flowchart of a method for sharing content according to an embodiment of the present disclosure.

FIG. 8 illustrates a flowchart of a method for sharing content according to an embodiment of the present disclosure.

In step S810, sensing, by a sensor, an action of at least one of a plurality of first terminal devices to generate sensor data;

In step S820, determining whether a sharing event occurs based on the sensor data from the sensor;

In step S830, acquiring data related to content to be shared from at least one of the plurality of first terminal devices in response to the occurrence of the sharing event;

In step S840, analyzing the date related to content to be shared to obtain an indication of the content to be shared; and In step S850, transmitting the indication of the content to be shared to at least one of a plurality of second terminal devices.

Figure 9:
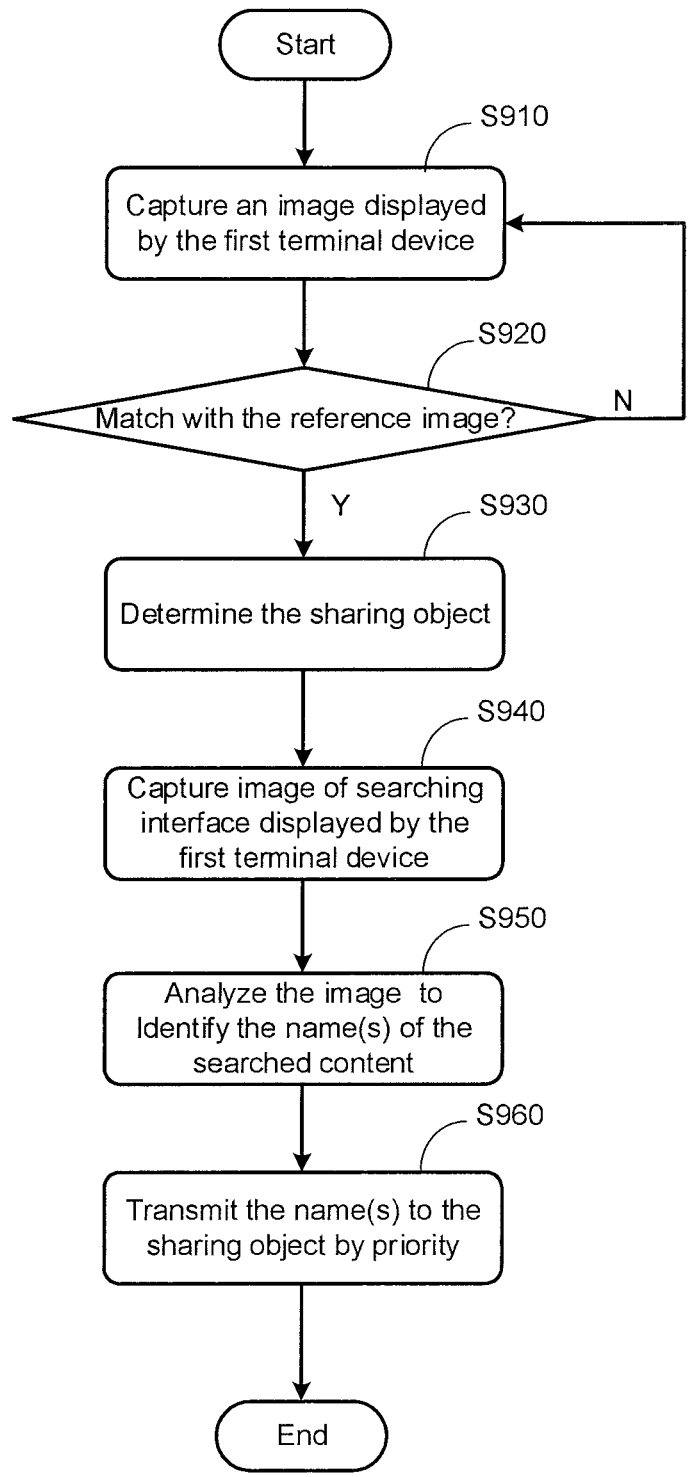
FIG. 9 illustrates a flowchart of a method for sharing content according to another embodiment of the present disclosure.

FIG. 9 illustrates a flowchart of a method for sharing content according to another embodiment of the present disclosure. The method may be performed by the apparatus for sharing content according to any of embodiments of the present disclosure as described above. In this embodiment, the sensor of the apparatus for sharing content is an image sensor.

In step S910, an image displayed by the first terminal device is captured by the image sensor.

In step S920, the image from the image sensor is compared with a reference image, and if the image from the image sensor matches with a reference image, determines the sharing event occurs and proceeds to step S930, otherwise, returns to step S910 to capture image again.

In step S930, the second terminal device matching with the sharing event is determined as the sharing object. In this step, the sharing object may be determined as described above.

Figure 10:
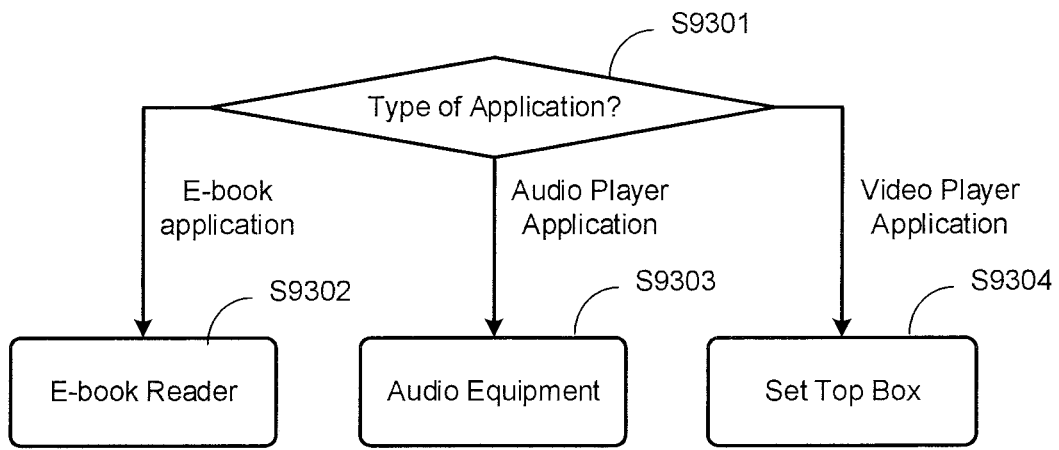
FIG. 10 illustrates a flowchart of determining the sharing in the method of FIG. 9.

FIG. 10 illustrates a flowchart of determining the sharing in the method of FIG. 9.

In step S9301, the type of the application being used is determined according to the sensor data.

As an example, the image of the starting interface of the application being used on the mobile phone may be compared with the reference image to determine the type of the application being. If the image from the image sensor matches with the image of the starting interface of the e-book application, the application being used is determined as e-book application, and the process proceeds to step S9302 in which the e-book reader 300A is determined as the sharing object; if the image from the image sensor matches with the image of the starting interface of the audio player application, the application being used is determined as audio player application and the process proceeds to step S9303 in which the stereo equipment 300B is determined as the sharing object; and if the image from the image sensor matches with the image of the starting interface of the video player application, the application being used is determined as video player application and the process proceeds to step S9304 in which the set top box is determined as the sharing object.

As another example, the application being used on the first terminal device may be identified according to the voice command from the audio sensor. If it is identified that the application being used is an e-book application, the process proceeds to step S9302. If it is identified that the application being used is an audio player application, the process proceeds to step S9303. If it is identified that the application being used is a video player application, the process proceeds to step S9304.

In step S940, an image of a searching interface displayed by the first terminal device where the sharing event occurs is captured by the image sensor.

In step S950, the image of the searching interface is analyzed to identify name(s) of the searched content.

In step S960, as the indication of the content to be shared, the name(s) of the searched content is transmitted to the sharing object via the wireless local area network interface by priority.

Figure 11:
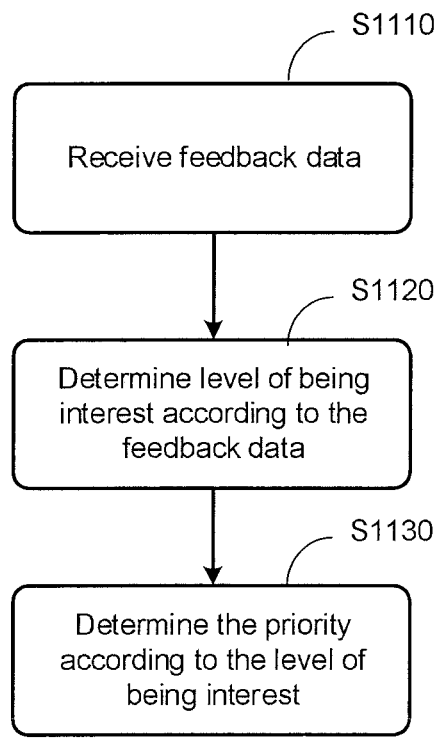
FIG. 11 illustrates a flowchart of determining the priority of the content to be shared in the method of FIG. 9.

FIG. 11 illustrates a flowchart of determining the priority of the content to be shared in the method of FIG. 9. The priority of the content to be shared may be updated after the content sharing is finished or updated periodically.

In step S1101, feedback data related to the checking of the content to be shared is received from the sharing object via the WLAN interface. The feedback data related to the checking of the content to be shared comprises at least one of: number of checking(s) of the content to be shared, duration of checking(s) of the content to be shared, and purchase of the content to be shared.

In step S1102, a level of being interest to the content to be shared is determined according to the feedback data.

In step S1103, the priority of the content to be shared is determined for the sharing object based on the level of being interest.

Figure 12:
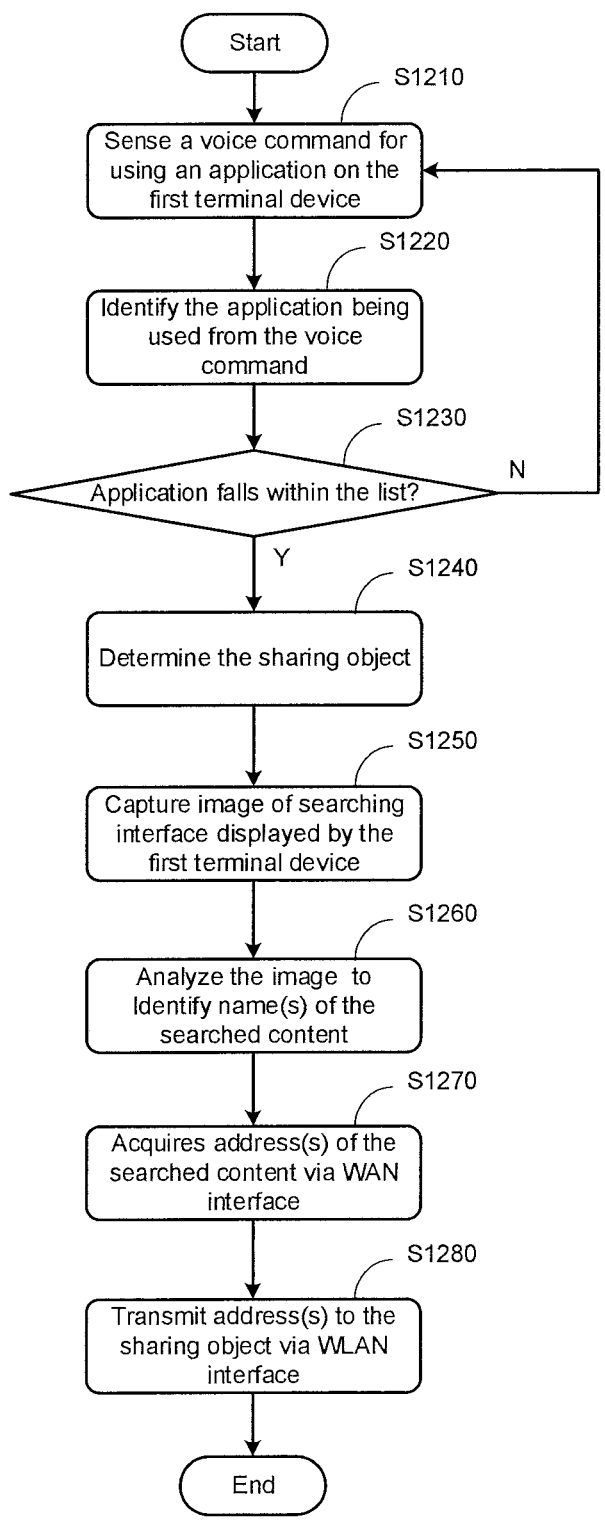
FIG. 12 illustrates a flowchart of a method for sharing content according to yet another embodiment of the present disclosure.

FIG. 12 illustrates a flowchart of a method for sharing content according to yet another embodiment of the present disclosure. The method may be performed by the apparatus for sharing content according to any of embodiments of the present disclosure as described above. In this embodiment, apparatus for sharing content comprising an image sensor and an audio sensor.

In step S1201, a voice command for using the application on the first terminal device is sensed by the audio sensor.

In step S1202, the application being used on the first terminal device is identified according to the voice command.

In step S1203, determining whether the application being used falls with the list of applications, and if yes, determines that the sharing event occurs, the process proceeds to step S1204, otherwise returns to step S1210.

In step S1204, the sharing object is determined according to the application being used. This step may be performed as described above with reference to FIG. 10.

In step S1025, an image of a searching interface displayed by the first terminal device where the sharing event occurs is captured by the image sensor.

In step S1026, the image of the searching interface is analyzed to identify name(s) of the searched content.

In step S1027, address(es) of the searched content is acquired from the internet via the WAN interface.

In step S1028, as the indication of the content to be shared, the address(es) of the searched content is transmitted to the sharing object via the wireless local area network interface by priority. The priority of the content to be shared may be determined and updated as described above with reference to FIG. 11.

The above detailed description has already set forth numerous embodiments of apparatuses, systems and methods for sharing content with reference to the diagrams, flow charts, and/or examples. In the case where the diagrams, flow charts, and/or examples comprise one or more functions and/or operations, one skilled in the art should appreciate that each function and/or operation in the diagrams, flow charts, or examples may be implemented by various structures, hardware, software, firmware or any combination thereof either alone and/or in any combination. In an embodiment, several parts of the subject matter described in the embodiments of the present disclosure may be implemented by Application Specific Integrated Circuit (ASIC), Field Programmable Gate Array (FPGA), Digital Signal Processor (DSP), or any other integrated form. However, one skilled in the art should appreciate that some aspects of the embodiment disclosed herein may be partially or wholly implemented in an integrated circuit effectively, implemented as one or more computer programs running on one or more computers (for example, one or more programs running on one or more computer systems), implemented as one or more programs running on one or more processors (for example, one or more programs running on one or more micro-processors), implemented as firmware, or substantially any combination thereof, and one skilled in the art is capable to design the circuit and/or write software and/or firmware code. Further, one skilled in the art would appreciate that the mechanism of the subject matter of the present disclosure may be distributed in various forms of program products, and the exemplary embodiments of the subject matter of the present disclosure may be applicable irrespective of the specific types of signal carrier media for distribution. Examples of the signal carrier media comprise but not limited to: a recordable medium such as floppy disk, hard drive, compact disk (CD), digital versatile disk (DVD), digital tape, computer memory, etc.; and a transmission medium, such as digital and/or analog communication medium (for example, optical fiber, waveguide, wired communication link, wireless communication link, etc.)

Although the present disclosure has been described with reference to several exemplary embodiments, it should be understood that the terms used are illustrative and exemplary instead of being restrictive. The present disclosure may be embodied in a variety of forms without departing from the spirit or essence of the present disclosure, and therefore it should be understood that the above-described embodiments are not limited to any details described above, and should be widely explained within the spirit and scope defined by the appended claims. Therefore, all changes and modifications which fall within the scope of the claims or the equivalents thereof should be covered by the appended claims.

I claim:

1. An apparatus for sharing content comprising:
   a sensor configured to sense an action of at least one of a plurality of first terminal devices to generate sensor data;
   a processor; and
   a first storage configured to store processor-executable instructions,
   wherein when the processor-executable instructions stored in the first storage are executed by the processor, the processor is configured to perform steps of:
      determining whether a sharing event occurs based on the sensor data from the sensor;
      acquiring data related to content to be shared from at least one of the plurality of first terminal devices in response to the occurrence of the sharing event;
      analyzing the date related to content to be shared to obtain an indication of the content to be shared; and
      transmitting the indication of the content to be shared to at least one of a plurality of second terminal devices,
   wherein the apparatus further comprises a wireless local area network interface configured to establishing connections to the plurality of first terminal devices and the plurality of second terminal devices, and the processor is further configured to determine at least one of the plurality of second terminal devices as a sharing object according to the sensor data, and transmit the indication of the content to be shared to the sharing object via the wireless local area network interface; and
   wherein the sensor comprises an image sensor, and the sensor data from the image sensor comprises an image displayed by the at least one of the plurality of first terminal devices; the content sharing device further comprises a second storage configured to store a reference image; and the processor is configured to determine whether the image from the image sensor matches with the reference image stored in the second storage, and if yes, determine the sharing event occurs, determine the second terminal device matching with the sharing event as the sharing object, capture, by using the image sensor, an image of a searching interface displayed by the first terminal device where the sharing event occurs, analyze the image of the searching interface to identify a name of the searched content, and transmit, as the indication of the content to be shared, the name of the searched content to the sharing object via the wireless local area network interface.

2. The apparatus according to claim 1, wherein the processor is further configured to:
   after the indication of the content to be shared is transmitted to the sharing object, receive from the sharing object, feedback data related to the checking of the content to be shared via the wireless local area network interface, determine a level of being interest to the content to be shared according to the feedback data, and determine the priority of the content to be shared for the sharing object based on the level of being interest; and
   after the indication of the content to be shared is obtained and the sharing object is determined, transmit the indication of the content to be shared to the sharing object by priority.

3. The apparatus according to claim 2, wherein the feedback data related to the checking of the content to be shared comprises at least one of: number of checking(s) of the content to be shared, duration of checking(s) of the content to be shared, and purchase of the content to be shared.

4. The apparatus according to claim 1, wherein
the reference image comprises an image of a starting interface of an application which is one of an e-book application, an audio player application, and a video player application, and
the second terminal device is one of an e-book reader, a stereo equipment and a set top box.

5. The apparatus according to claim 4, wherein the processor is configured to determine the e-book reader as the sharing object when the image from the image sensor matches with the image of the starting interface of the e-book application, determine the stereo equipment as the sharing object when the image from the image sensor matches with the image of the starting interface of the audio player application, and determine the set top box as the sharing object when the image from the image sensor matches with the image of the starting interface of the video player application.

6. The apparatus according to claim 1, wherein the processor is further configured to before determining whether the image from the image sensor matches with the reference image stored in the second storage, determine whether the image from the image sensor does not change for predetermined period of time, and if yes, perform the step of determining whether the image from the image sensor matches with the reference image stored in the second storage.

7. The apparatus according to claim 1, wherein
the sensor further comprises an audio sensor, and the sensor data from the audio sensor comprises a voice command for using the application on the first terminal device;
the second storage is further configured to store a list of applications; and
the processor is further configured to identify the application being used on the first terminal device according to the voice command, determine whether the application being used falls with the list of applications, and if yes, determine the sharing event occurs and determine the sharing object according to the application being used.

8. The apparatus according to claim 1, further comprising a wide area network interface configured to connect to a content provider via internet, wherein the processor is configured to after the name of the searched content is identified, acquire an address of the searched content from the content provider via the wide area network according to the name of the searched content, and transmit, as the indication of the content to be shared, the address of the searched content to the sharing object via the wireless local area network interface.

9. A system for sharing content comprising:
an apparatus for sharing content comprising:
a sensor configured to sense an action of at least one of a plurality of first terminal devices to generate sensor data;
a processor; and
a first storage configured to store processor-executable instructions,
wherein when the processor-executable instructions stored in the first storage are executed by the processor, the processor is configured to perform steps of:
determining whether a sharing event occurs based on the sensor data from the sensor;
acquiring data related to content to be shared from at least one of the plurality of first terminal devices in response to the occurrence of the sharing event;
analyzing the date related to content to be shared to obtain an indication of the content to be shared; and
transmitting the indication of the content to be shared to at least one of a plurality of second terminal devices,
wherein the apparatus further comprises a wireless local area network interface configured to establishing connections to the plurality of first terminal devices and the plurality of second terminal devices, and the processor is further configured to determine at least one of the plurality of second terminal devices as a sharing object according to the sensor data, and transmit the indication of the content to be shared to the sharing object via the wireless local area network interface; and
wherein the sensor comprises an image sensor, and the sensor data from the image sensor comprises an image displayed by the at least one of the plurality of first terminal devices; the content sharing device further comprises a second storage configured to store a reference image; and the processor is configured to determine whether the image from the image sensor matches with the reference image stored in the second storage, and if yes, determine the sharing event occurs, determine the second terminal device matching with the sharing event as the sharing object, capture, by using the image sensor, an image of a searching interface displayed by the first terminal device where the sharing event occurs, analyze the image of the searching interface to identify a name of the searched content, and transmit, as the indication of the content to be shared, the name of the searched content to the sharing object via the wireless local area network interface.

10. A method for sharing content comprising:
sensing, by a sensor, an action of at least one of a plurality of first terminal devices to generate sensor data;
determining whether a sharing event occurs based on the sensor data from the sensor;
acquiring data related to content to be shared from at least one of the plurality of first terminal devices in response to the occurrence of the sharing event;
analyzing the date related to content to be shared to obtain an indication of the content to be shared; and
transmitting the indication of the content to be shared to at least one of a plurality of second terminal devices,
wherein the apparatus further comprises a wireless local area network interface configured to establishing connections to the plurality of first terminal devices and the plurality of second terminal devices, and the method further comprises determining at least one of the plurality of second terminal devices as a sharing object according to the sensor data, and transmitting the indication of the content to be shared to the sharing object via the wireless local area network interface; and
wherein the sensor comprises an image sensor, the sensor data from the image sensor comprises an image displayed by the at least one of the plurality of first terminal devices, and the method further comprises:
determining whether the image from the image sensor matches with a reference image, and if yes, determining the sharing event occurs;
determining the second terminal device matching with the sharing event as the sharing object;

capturing, by using the image sensor, an image of a searching interface displayed by the first terminal device where the sharing event occurs;

analyzing the image of the searching interface to identify a name of the searched content; and transmitting, as the indication of the content to be shared, the name of the searched content to the sharing object via the wireless local area network interface.

11. The method according to claim 10, further comprising:

after the indication of the content to be shared is transmitted to the sharing object, receiving, from the sharing object, feedback data related to the checking of the content to be shared via the wireless local area network interface, determining a level of being interest to the content to be shared according to the feedback data, and determining the priority of the content to be shared for the sharing object based on the level of being interest; and after the indication of the content to be shared is obtained and the sharing object is determined, transmitting the indication of the content to be shared to the sharing object by priority.

12. The method according to claim 10, wherein the reference image comprises an image of a starting interface of an application which is one of an e-book application, an audio player application, and a video player application, and the second terminal device is one of an e-book reader, a stereo equipment and a set top box.

13. The method according to claim 12, wherein determining the second terminal device matching with the sharing event as the sharing object comprises:

determining the e-book reader as the sharing object when the image from the image sensor matches with the image of the starting interface of the e-book application;

determining the stereo equipment as the sharing object when the image from the image sensor matches with the image of the starting interface of the audio player application; and determining the set top box as the sharing object when the image from the image sensor matches with the image of the starting interface of the video player application.

14. The method according to claim 10, further comprising: before determining whether the image from the image sensor matches with the reference image stored in the second storage, determining whether the image from the image sensor does not change for predetermined period of time, and if yes, performing the step of determining whether the image from the image sensor matches with the reference image stored in the second storage.

15. The method according to claim 10, wherein the sensor further comprises an audio sensor, the sensor data from the audio sensor comprises a voice command for using the application on the first terminal device, and the method further comprises:

identifying the application being used on the first terminal device according to the voice command;

determining whether the application being used falls with the list of applications, and if yes, determining the sharing event occurs and determining the sharing object according to the application being used.

16. The method according to claim 10, wherein the apparatus further comprises a wide area network interface configured to connect to a content provider via internet, and the method further comprises:

after the name of the searched content is identified, acquiring an address of the searched content from the content provider via the wide area network according to the name of the searched content; and transmitting, as the indication of the content to be shared, the address of the searched content to the sharing object via the wireless local area network interface.

\* \* \* \* \*